US008660677B2

(12) United States Patent
Theimer et al.

(10) Patent No.: US 8,660,677 B2
(45) Date of Patent: Feb. 25, 2014

(54) SOUND PRESSURE LEVEL-AWARE MUSIC PLAYLISTS

(75) Inventors: Wolfgang Michael Theimer, Bochum (DE); Frank von Heimburg, Bochum (DE); Frederik Nicolas Goerges, Bochum (DE); Wolfgang Edeler, Vreden (DE); Gunther Heinrich Burghardt, Bochum (DE); Jens Koenig, Bochum (DE)

(73) Assignee: BlackBerry Limited, Waterloo (CA)

(*) Notice: Subject to any disclaimer, the term of this patent is extended or adjusted under 35 U.S.C. 154(b) by 662 days.

(21) Appl. No.: 12/621,127

(22) Filed: Nov. 18, 2009

(65) Prior Publication Data

US 2011/0118860 A1 May 19, 2011

(51) Int. Cl.
*G06F 17/00* (2006.01)

(52) U.S. Cl.
USPC .......... 700/94

(58) Field of Classification Search
USPC .......... 700/94; 381/320, 71.1, 71.11, 71.14, 381/72, 94.3, 98–109
See application file for complete search history.

(56) References Cited

U.S. PATENT DOCUMENTS

| | | | |
|---|---|---|---|
| 5,172,358 | A | 12/1992 | Kimura |
| 6,177,623 | B1 | 1/2001 | Ooseki |
| 7,003,123 | B2 | 2/2006 | Kanevsky |
| 2005/0147004 | A1 | 7/2005 | Kumagai et al. |
| 2008/0181442 | A1 | 7/2008 | Goldstein |

FOREIGN PATENT DOCUMENTS

| | | |
|---|---|---|
| GB | 2430319 | 3/2007 |

OTHER PUBLICATIONS

Examination Report dated Mar. 19, 2012, for corresponding European Application No. 09176402.7, 6 pages.

SCENIHR; European Commission, Directorate-General for Health and Consumers; Potential health risks of exposure to noise from personal music players and mobile phones including a music playing function; Sep. 23, 2008; http://ec.europa.eu/consumers/safety/projects/docs/noise-workgroup-report.pdf.

SCENIHR; European Commission, Directorate-General for Health and Consumers; Potential health risks of exposure to noise from personal music players and mobile phones including a music playing function; Sep. 23, 2008; http://ec.europa.eu/health/ph risk/committees/04 scenihr/docs/scenihr o 018.pdf.

Extended European Search Report; EP09176402.7; issued Mar. 1, 2010.

Communication Pursuant to Art. 94(3) EPC dated Oct. 1, 2012, for corresponding European Application No. 09176402.7.

*Primary Examiner* — Andrew C Flanders

(74) *Attorney, Agent, or Firm* — Novak Druce Connolly Bove + Quigg LLP

(57) ABSTRACT

The present document relates to media players, such as portable electronic devices, vehicle audio systems, home stereo systems, etc. In particular, it relates to the management of the sound pressure level generated by portable electronic devices. A method and system for controlling the cumulated audio dose of a user of a media player is described. The method comprises the steps of determining the audio dose already consumed by the user and of selecting one or more media tracks for play back on the media player based on the audio dose of the media track and the already consumed audio dose of the user.

12 Claims, 4 Drawing Sheets

*FIG. 3*

SOUND PRESSURE LEVEL-AWARE MUSIC PLAYLISTS

TECHNICAL FIELD

The present document relates to media players, such as portable electronic devices, vehicle audio systems, home stereo systems, etc. For example, it relates to the management of the sound pressure level generated by portable electronic devices.

BACKGROUND

Mobile media players have emerged as one preferred platform for listening to music. Music playback has become a feature of most mobile phones as well. While the exposure to occupational noise has decreased in recent years due in part to workplace legislation, the exposure to so called "social noise"—including music—has increased drastically. Music listening becomes a health risk if a user chooses to listen to music for longer periods of time at high audio volume levels, which studies suggest may lead to hearing impairments like loss of hearing sensitivity, disability to separate different sounds or tinnitus.

BRIEF DESCRIPTION OF THE DRAWINGS

The present disclosure is explained below in an exemplary manner with reference to the accompanying drawings, wherein.

DETAILED DESCRIPTION

Figure 1A:
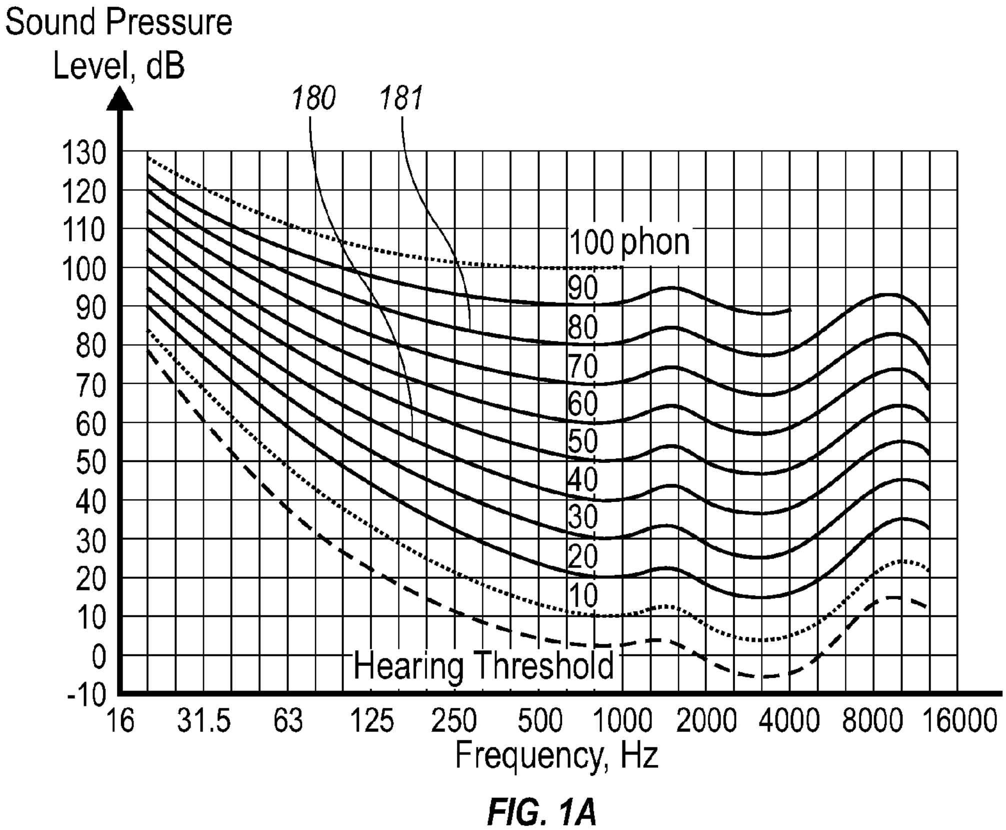
FIG. 1*a* illustrates exemplary graphs of the sound pressure level sensitivity for human listeners, also referred to as the equal-loudness contour.

According to an aspect, a method for controlling the cumulated and/or consumed audio dose of a user of a media player is described. The media player may e.g. be an audio player (such as a personal music player), a video player (such as a portable DVD player) or other portable electronic devices. The audio dose may be given by the sound pressure level which a user has been exposed to during a given time interval. An audio dose is assumed to be "consumed" by a user when the audio dose is output by the media player and the user could be exposed to the audio dose. For purposes of the method, an audio dose is deemed to be "consumed" even if the user is not actually exposed to the audio dose. In other words, the method is not dependent upon any action or inaction by the user.

The method may comprise the step of determining the audio dose already consumed by the user. Furthermore, the method may comprise the step of selecting one or more media tracks for play back on the media player based on the audio dose of the media track and the already consumed audio dose of the user. The media tracks may comprise audio tracks, music tracks or video tracks with an associated audio track.

The step of determining the consumed audio dose may comprise determining the audio dose consumed within a predetermined time interval prior to the time instance of playing back the selected media track. The consumed audio dose may be directly determined as the physically produced sound pressure level at the headphones and/or speakers of the media player. The audio dose of a media track may also be determined from a digital representation of the audio track, e.g. the digital samples of the media track. A scaling factor may be applied to take into account the rendering characteristics of the media player, i.e. notably the volume settings of the media player and/or the sensitivity of the headphones. As such, the consumed audio dose may be determined from the digital representation of the media track and a scaling factor representing the rendering characteristics of the media player.

The step of determining the consumed audio dose may comprise weighting the consumed audio dose with a weight associated with the time instance at which the audio dose was consumed. The weight may decrease with increasing anteriority of the consumed audio dose, thereby reflecting the physiological memory of the human ear.

The step of determining the audio dose of a media track may comprise determining spectral components of the media track and/or weighting the spectral components using weights associated with human auditory perception and/or determining the audio dose of the media track based on the weighted spectral components. In other words, the audio dose of a media track may take into account the human auditory perception, e.g. through weighting with an A-curve. These steps may be performed on the digital representation of the audio track. The determined value of the audio dose may need to be multiplied with the scaling factor representing the rendering characteristics of the media player, in order to obtain an audio dose value which corresponds to the perceived sound pressure level of the user of the media player.

The step of determining the audio dose of a media track may comprise the steps of extracting a plurality of segments of the media track using a window function and/or of determining the audio doses for the plurality of segments of the media track and/or of determining the audio dose of the media track as the sum of the audio doses of the plurality of segments of the media track. Such windowing may be beneficial in order to isolate quasi-stationary segments of a media track. As a result, the spectral components of a media track may be determined on such quasi-stationary segments of the media track for determining the audio dose of the segment of the media track.

It may be beneficial to determine an average audio dose of the plurality of segments of the media track. Such average audio dose may also be referred to as an audio dose contribution. The total audio dose of the media track may then be determined by multiplying the average audio dose with a factor related to the length of the media track and the length of the window function.

The method may comprise the further steps of weighting the already consumed audio dose by a first weight and/or weighting the audio dose of a media track by a second weight and/or determining a weighted sum of the consumed audio dose and the audio dose of the media track. The second weight may depend on the duration of the media track. The first and second weight may add up to 1. The second weight may decrease with an increased duration of the media track. The weighted sum of the consumed audio dose and the audio dose of the media track typically yields the value of the consumed audio dose after play back of the media track. The weights may be used to model the physiological memory characteristics of the human ear.

The audio dose consumed by the user may be updated, wherein the updating may be based on a leaky integration of the previously consumed audio dose and the audio dose of the selected media track. Such leaky integration may e.g. be implemented by weighting of the previously consumed audio dose and the audio dose of the selected media track.

The method may further comprise the step of determining the audio dose of a plurality of media tracks that are available on the media player. As a consequence, the individual audio dose of the media tracks may be used for selecting a particular media track for play back. The media track with the lowest determined audio dose may be selected from the plurality of media tracks for play back on the media player.

The audio dose values may also be used to determine a playlist of media tracks. A playlist typically comprises a plurality of media tracks which are played back in a random or predetermined order. Such a playlist for playing back media tracks on the media player may be determined by selecting media tracks from the plurality of media tracks based on the individual audio doses of the media tracks and the already consumed audio dose of the user. The selection of the media tracks may be performed such that the requirements with regards to a maximum cumulated consumed audio dose are met.

A playlist of media tracks may be generated by the steps of determining the weighted sum for a plurality of media tracks and/or by selecting a media track with a smallest weighted sum amongst the plurality of media tracks or a weighted sum smaller than a pre-determined value (a value that is determined before the playlist generation begins). In other words, the potentially consumed audio dose for a plurality of media tracks may be calculated in advance. This may be done under consideration of the previously consumed audio dose. Subsequently, the plurality of media tracks may be selected for play back in a playlist, which provides the smallest calculated potentially consumed audio dose or which provides a calculated potentially consumed audio dose which does not exceed a predefined value, e.g. a maximum allowed audio dose.

The method may further comprise the steps of selecting a media category including a plurality of media tracks that are available for playback on the media player, wherein the selection of a media track is restricted to media tracks from the selected category. In other words, a playlist may be generated under consideration of the audio dose of the media tracks and in addition under consideration of user preferences, such a media categories, genres, interprets, etc.

According to an aspect, an electronic device is described. The electronic device may comprise an audio rendering component configured to generate an audio dose to a user. Typically the audio rendering component is associated with a scaling factor representing its rendering characteristics, e.g. the volume settings and the headphone sensitivity. The device may further comprise a memory configured to store a plurality of media tracks. The device may also comprise a processor configured to execute the method steps outlined in the present patent document. In particular, the processor may be configured to determine the audio dose already consumed by the user and/or to determine the audio dose of at least one of the plurality of media tracks and/or to select a media track for play back based on the audio dose of the media track and the already consumed audio dose.

According to an aspect, a storage medium is described. The storage medium comprises a software program adapted for execution on a processor and for performing any of the method steps outlined in the present document when carried out on a computing device.

According to an aspect, a computer program product is described. The computer program product represents a tangible storage item (including but not limited to an optical disk or magnetic storage medium) that includes executable instructions that can cause a processor to perform any of the method steps outlined in the present document when carried out on a machine such as a computer, dedicated media player, mobile telephone or smartphone.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

Mobile media players, such as mobile audio players have become an important source of “social noise” which may present a hearing impairment risk to users of the media players. In order to reduce this risk, national governments as well as the European Community (EC) want to follow the scientific advice by limiting the audio dose to sound pressure levels that are less likely to cause hearing impairments over the years. For the work place, the EC has limited the sound pressure level (SPL), weighted by the human frequency sensitivity curve (A-curve) to 80 dB(A) for an eight hour working day (40 hours per week). An equivalent audio dose would be double the sound pressure energy (83 dB(A)) for 20 hours accumulated exposure per week or four times the SPL energy (86 dB(A)) for 10 hours accumulated exposure per week. The unit “dB(A)” refers to the actual sound pressure levels (measured in dB), weighted by the respective A-curve.

Table 1 shows the examples of equivalent time-intensity pressure levels, also referred to as action levels, specified by the European Community directive 2003/10/EC for Noise at Work.

TABLE 1

| Action level | $L_{Aeq}$ 8 h | Equivalent levels for time indicated |
|---|---|---|
| First Action level (minimum) provide protection | 80 dB(A) - 8 hr | 83 dB(A) - 4 hr<br>86 dB(A) - 2 hr<br>89 dB(A) - 1 hr . . . |
| Second Action level mandatory protection | 85 dB(A) - 8 hr | 88 dB(A) - 4 hr<br>91 dB(A) - 2 hr<br>94 dB(A) - 1 hr . . . |
| Maximum Exposure limit value | 87 dB(A) - 8 hr | 90 dB(A) - 4 hr<br>93 dB(A) - 2 hr<br>96 dB(A) - 1 hr . . . |

The sound pressure levels (SPL) for typical sounds are shown below in Table 2.

TABLE 2

| Source/observing situation | Typical sound pressure level (db SPL) |
|---|---|
| Hearing threshold | 0 dB |
| Leaves fluttering | 20 dB |
| Whisper in an ear | 30 dB |
| Normal speech conversation for a participant | 60 dB |
| Cars/vehicles for a close observer | 60-100 dB |
| Airplane taking-off for a close observer | 120 dB |

TABLE 2-continued

| Source/observing situation | Typical sound pressure level (db SPL) |
|---|---|
| Pain threshold | 120-140 dB |

Furthermore, the human frequency sensitivity A-curve is illustrated in FIG. 1*a*. It can be seen that the A-curves model the observation that human beings are most sensitive to frequencies around 3-4 kHz and least sensitive to the lowest frequencies. The A-curve 180 indicates that a sound pressure level of 100 dB at 20 Hz is perceived by the human ear with the same loudness as a sound pressure level of 40 dB at 1 kHz. Consequently, the human ear may support higher sound pressure levels at low frequency than at high frequencies.

Furthermore, the sensitivity of the ear also depends on the sound level itself. At a sound level of 40 phon, the A-curve 180 drops steeper with increasing frequency than the A-curve 181 at a higher sound level of 80 phon. A "phon" is a unit which describes the perceived loudness level for pure tones, i.e. the phon scale aims to compensate for the effect of frequency on the perceived loudness of tones. By definition, 1 phon is equal to 1 dB sound pressure level at a frequency of 1 kHz. This can be seen in FIG. 1*a*, where the phon values of the different A-curves 180, 181 correspond to the dB value at 1 kHz.

Figure 1B:
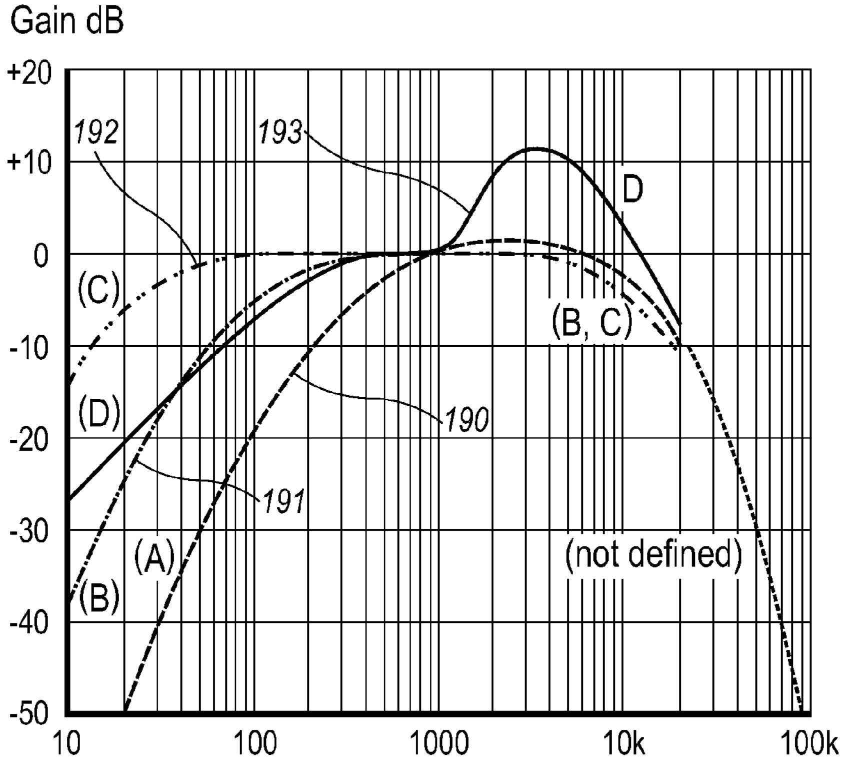
FIG. 1*b* illustrates exemplary perceptual weighting curves.

FIG. 1*b* illustrates exemplary weighting curves, whereas the curve 190 corresponds to one of the human frequency sensitivity curves illustrated in FIG. 1*a*. It should be noted that other weighting schemes than A-curve weighting 190 exist. Further examples are B-curve weighting 191, C-curve weighting 192 or D-curve weighting 193. In the presently described methods and systems any of these weighting schemes which model human auditory perception may be applied.

With the emergence of personal music players (PMP), notably MP3-based music players, the use of such devices has significantly increased. In 2007 between 40 and 50 million portable audio devices were sold in the countries of the European Union. These devices, which users may control to increase the volume of the sound output, may expose their users on a regular basis to sound pressure levels that range from 60 dB(A) to 120 dB(A) and it has been assumed by the EC that approximately 10% of the users are at risk of developing a permanent hearing impairment due to an excessive exposure to sound pressure levels above 85 dB(A).

Consequently, a significant percentage of the daily audio dose of a (PMP) user may originate from the PMPs by listening to music via headphones or the built-in speaker(s). Headphones can reach SPLs of 115 dB(A) and even more if they are tightly coupled to the ear drum (e.g. in-ear headphones). As such, they may significantly exceed the sound pressure levels considered to be harmful. Such high sound pressure levels may be experienced without harm for a short period of time, but it is strongly suggested that the accumulated sound pressure level over a given period of time is kept below a certain limit. This is also reflected in the equivalent sound pressure levels listed in Table 1.

It is therefore desirable to provide media players with an ability to limit the overall sound pressure level generated by the media player. In particular, it may be beneficial to provide media players which keep the audio dose that is generated over a certain period of time below a predefined or allowed limit. This target should preferably be achieved for fixed volume settings. That is to say, while the cumulated audio dose is kept below a predefined or predetermined limit (such as, but not limited to, a limit set by a regulatory agency or standards body), the user experience should be enhanced to a degree preferred by the user (for example, enabling a user to choose to listen to audio at a fixed—and perhaps generally high—volume). In other words, unless the user adjusts the volume manually, the volume settings of the media player are generally kept unchanged during a predefined period of time. Such predefined period of time may be given e.g. by a predefined time interval or by a predefined set of audio tracks.

According to an aspect, a playlist of media tracks is suggested to the user so that the accumulated sound pressure dose of the proposed playlist on top of the listening exposure of the past is below a predefined limit. In general, a media track is a recorded sound or sounds, generally having a beginning, an ending and a playback duration. The recorded sounds may be accompanied by media information other than audio information, such as video information. Because the techniques discussed herein are generally applicable to the audio portion of a multi-media track, the terms "media track" and "audio track" are used herein synonymously.

The playlist typically comprises one or more audio tracks which are played back on the media player in a predetermined or arbitrary manner. In order to enhance the overall user experience, the audio volume setting should remain unchanged during playback of the playlist (unless the user adjusts any of the settings manually to the user's own preferred settings). Instead, the audio content may be changed to meet the cumulated audio dose target, while keeping the volume level of the media player constant. In other words, one or more audio tracks are selected that can be played at the fixed volume settings, while maintaining the cumulated audio dose below or at the predefined limit.

A playlist is typically specified by a set of media tracks, e.g. audio tracks and/or video tracks. The length of the playlist may be defined as the number of media tracks which it comprises and/or as the cumulated duration of the playback of the set of media tracks. The set of media tracks which is comprised in a playlist is typically selected from a larger collection of media tracks, e.g. from a media track database that is stored on the user's media player and/or from appropriate web sites. The selection of the set of media tracks may be based, for example, on the author of an audio track, the genre of the media track, and/or other preferences of the user. The set of media tracks of a playlist may be played back in a predefined order or randomly. In other words, the generation of a playlist may be submitted to constraints. As outlined above, such constraints may be related to the audio dose contribution of the selected media tracks. Furthermore, such constraints may be related to user preferences, such as genre, etc.

According to a further aspect, an average SPL value, weighted by the A-curve, may be computed for a media track. As discussed below, various signal processing techniques can be employed to determine SPL values. It is also possible to determine average SPL values for partial audio tracks, e.g. for blocks of a given duration of an audio track. Consequently, each audio or music track i, i=1, . . . , N, is modeled by an average SPL value $S_i$. These SPL values may be pre-computed and they may reflect the complete audio dose of the audio track or the audio dose of a predetermined time segment of the audio track. In the latter case, the complete audio dose may be determined by cumulating the sectional audio dose values over the length of the audio track.

In an embodiment, the SPL value for a music track i can be computed by taking the short-time Fourier spectrum of a suite of windowed signal segments (a suite of windowed signal segments being a set of short-duration pieces of the audio track), by applying the A-weighting curves 180, 181 or 190 shown in FIG. 1*a* and FIG. 1*b* to the spectrum of the windowed signal segments, and by summing up the frequency components for an SPL estimate $S_i(w)$ across the windows w, w=1, . . . , W of the music track i. An average audio dose contribution of the complete music track, comprising the W windows may be computed as $$S_i = \frac{1}{W}\sum_{w=1}^{W} S_i(w).$$

In order to reduce computational complexity it may be beneficial to down-sample the number of windows of a music track, since the sounds are typically stationary for a short period of time.

In the above example, the SPL value $S_i$ corresponds to the average SPL value of the audio track i within a certain window. Given the duration or length $T_w$ of the window and the duration or length $T_i$ of the audio track i, the total SPL value of the audio track i may be given by $$A_i = S_i\frac{T_i}{T_w}.$$

$A_i$ may also be referred to as the audio dose of the audio track i. It should be noted that the length $T_w$ of the window typically depends on the form/progression of the window. For a rectangular window $T_w$ may be the actual length of the window, whereas for a Gaussian window $T_w$ may depend on the underlying variance of the Gaussian window.

Figure 2:
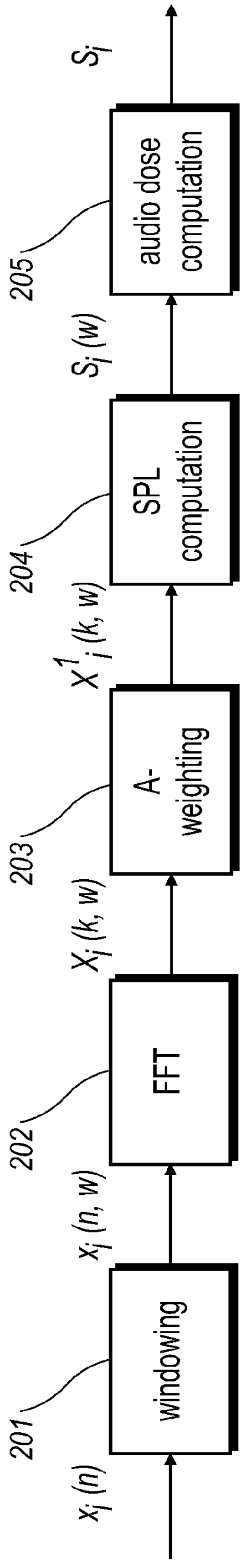
FIG. 2 illustrates an exemplary method for the determination of a music track audio dose.

The process of audio dose computation for a music or audio track is illustrated in FIG. 2. An audio track $x_i(n)$ is segmented into subsections using a window unit 201. The window unit 201 applies a moving window across the audio track $x_i(n)$ and thereby extracts quasi-stationary subsections $x_i(n, w)$ of the audio track. Possible window functions are e.g. a Gaussian window, a cosine window, a Hamming window, a Hann window, a rectangular window, a Bartlett window or a Blackman window. The subsections $x_i(n, w)$ are transformed into the frequency domain using the transform unit 202, thereby yielding a plurality of frequency subband coefficients $X_i(k, w)$.

The frequency subband coefficients are subsequently weighted using weights which are associated with human auditory perception. This is performed in the weighting unit 203 and yields the weighted subband coefficients $X_i'(k, w)$. The weights may be derived from the A-curves of FIG. 1. By way of example, the subband coefficient $X_i(\hat{k}, w)$ corresponding to the frequency 1 kHz may be used to select the applicable A-curve 180, 181. Then the subband coefficients $X_i(k, w)$ are multiplied with the selected A-curve 180, 181, or more precisely with a normalized and inverted A-curve 180, 181, in order to yield the weighted subband coefficients $X_i'(k, w)$.

Based on the weighted subband coefficients $X_i'(k, w)$ the perceived sound pressure level, e.g. the sound pressure level measured in dB(A), is determined in the SPL determination unit 203. This yields the perceived SPL estimate $S_i(w)$ for the windowed section of the audio track $x_i(n)$. The SPL determination unit 203 may comprise an inverse transform, converting the frequency subband coefficients into the time domain, thereby yielding a weighted subsection $x_i'(n, w)$ of the audio track. This weighted subsection $x_i'(n, w)$ is transformed into sound pressure by the audio rendering means of the respective media player, e.g. a D/A converter and an amplifier in combination with a speaker or a headphone. The specification of the audio rendering means and/or volume settings influence the actually generated sound pressure level. However, a normalized SPL value may be determined for the audio track $x_i(n)$. This normalized SPL value may be multiplied by a scaling factor to determine the actual perceived sound pressure level during playback. The scaling factor will typically depend on the specification of the audio rendering means and its actual volume settings. The normalized SPL value $S_i(w)$ may be determined as the root mean squared value of the samples of the weighted subsection $x_i'(n, w)$ of the audio track. Furthermore, the determination of the normalized SPL value $S_i(w)$ may involve normalization by a reference sound pressure and/or determination of a logarithmic value of the sound pressure.

Eventually, the normalized audio dose of the audio track $x_i(n)$ is determined in the audio dose computation unit 205. The average SPL value $S_i$ of the audio track $x_i(n)$ may be determined as the average SPL value $S_i(w)$ across the complete set of windows. In such cases, the SPL value represents the average audio dose of the audio track $x_i(n)$ within a predefined window of length $T_w$. The complete audio dose $A_i$ is obtained by integrating the $S_i$ values over the length $T_i$ of the audio track $x_i(n)$. In other words, the audio dose $A_i$ of audio track i is obtained by multiplying the average $S_i$ value with the length $T_i$ of the audio track i. Furthermore, the length $T_w$ of the window may have to be taken into consideration. As such, the audio dose $A_i$ of audio track i may be obtained by multiplying the average $S_i$ value with the length $T_i$ of the audio track divided by the length $T_w$ of the window.

Figure 3:
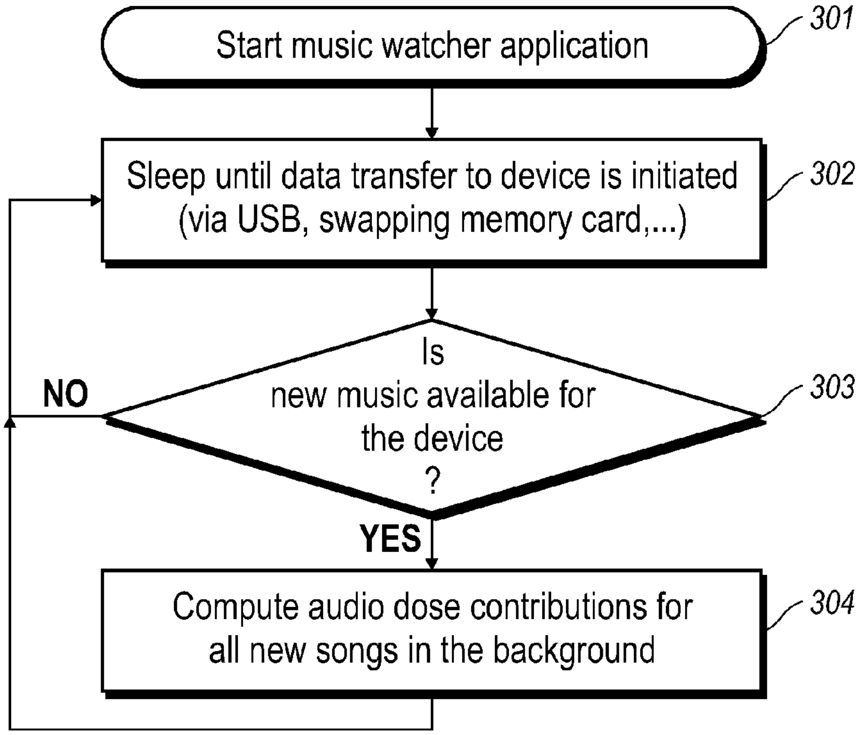
FIG. 3 shows a flow diagram of an exemplary method for downloading audio tracks onto a portable media player.

FIG. 3 shows a flow chart which describes the audio dose computation onboard, i.e. on the mobile device or the media player and preferably in the background (that is, without user intervention and/or user awareness). It should be noted that the concepts described herein are not limited to cases in which audio doses are determined by techniques such as those described above. The concepts are also applicable to situations in which audio tracks are downloaded with an associated audio dose value. For purposes of illustration, however, the flow chart of FIG. 3 illustrates a situation in which the audio doses are not obtained with audio tracks, but are computed onboard.

The audio dose computation may be triggered every time new music tracks are detected. A music watcher application is started in step 301. This music watcher application scans particular web sites for new audio or music tracks in the interest of the user. If a new music track is available, it is downloaded to the device, e.g. via USB or via a wireless communication network (step 302). The device checks the availability of new audio tracks (step 303) and if such tracks are available, an audio dose value is calculated for the new audio tracks (step 304).

By using the above methods and systems, media tracks i may be associated with audio dose values $A_i$ and/or average SPL values or audio dose contributions $S_i$. This may be done for the complete set of media tracks stored in the database of a media player and/or for the media tracks available at particular web sites. It should be noted that audio dose values $A_i$ and/or average SPL values $S_i$ may be normalized, i.e. they may be independent from the actual rendering characteristics of the particular media player. These rendering characteristics, e.g. the volume settings, the speaker sensitivity and/or the headphone sensitivity, may be reflected by a scaling factor F associated with the actual rendering characteristics. Consequently, the actual audio dose may be determined by multiplying the normalized audio dose value with the scaling factor F. In other words, the computation is done in the digital domain. The resulting sound pressure levels after digital-to-analog (D/A) conversion, amplification and conversion into acoustic energy via the speakers or headphones of an media player can be pre-computed for a particular media player configuration, if the design parameters of the media player and of the speakers/headphones are known. If these parameters are not known, then the sound pressure levels may be estimated e.g. by using a worst-case scenario. By way of example, the use of very sensitive headphones may be assumed in a worst-case scenario. Using such assumptions, a scaling factor F can be determined.

In the following, it is assumed without loss of generality, that the audio dose values $A_i$ and/or average SPL values $S_i$ correspond to the actually rendered audio dose values and/or SPL values.

Typically, a user has an audio listening history, i.e. what the user has been exposed to (and/or has actually heard) in the past until a certain time (t=0). From the audio listening history can be determined a cumulated audio dose A(0). This audio dose may be referred to as the already consumed audio dose.

At the starting time (t=0) the system proposes or adapts a playlist by inserting music (or other audio) tracks so that the accumulated audio dose, which is composed of the already consumed audio dose A(0) and the individual playlist contributions $S_i$ remains below the maximum allowed audio dose. This condition should be preferably met at all times.

If at any time, the accumulated audio dose exceeds the pre-determined level, the playlist may be adjusted such that eventually the accumulated audio dose drops below the allowed limit. If for example the starting value A(0) is above the limit, the playlist may be assembled (e.g., by selecting or by declining to select tracks as a function of the tracks' own audio doses) to aim at reducing the audio dose over time so that the final value is below the maximum limit.

It may be assumed that the volume level remains constant for the selection process of the playlist. If the user changes the volume level, an equivalent correction factor or scaling factor may be applied to the SPL contributions of each music track in the playlist. In other words, the above mentioned scaling factor F may be increased or decreased in accordance to the changes in volume.

As already outlined above, the overall audio dose for a user should preferably take into account the listening history of the device or user and the potential audio dose contributions of the music tracks played in the future. This may be done in different manners, whereby apart from the accumulation of the audio doses, also the time aspect should be taken into consideration. In particular, it should be taken into account that longer pieces of music would have a higher impact than shorter pieces of music. Furthermore, the impact of previously heard music tracks on the cumulated audio dose should decrease over time to model physiological memory effects of the human ear (which are discussed below).

As such, the accumulation process of audio doses may be modeled as a leaky integrator. Mathematically speaking the audio dose A(t) which has been consumed by a user at time t may be represented by a recursive filter $$A(t+T_i) = \alpha A(t) + (1-\alpha)A_i, \text{ with } \alpha = \frac{1}{1+cT_i},$$

where a music track i with a duration $T_i$ and an audio dose contribution $A_i$ is played next after time instance t. If only a partial audio track i is played, then the audio dose of the partial audio track may be obtained from the average SPL value $S_i$ of the audio track i. For this purpose the average SPL value $S_i$, typically normalized by the length $T_w$ of the window which was used to determine the SPL value $S_i$, is multiplied by the duration $T_p$ during which the audio track i was played back. This will provide the partial audio dose $A_{i,p}$ of the audio track i. In such cases, the values $A_{i,p}$ and $T_p$ replace the values $A_i$ and $T_i$ in the above equation.

The constant c determines a time constant of the audio dose integration. It may be used to model the auditory "memory" of the human ear, i.e. it may be used to reflect the physiological fact that typically the impact of a consumed audio dose on the ear decreases over time. As such, the constant c models a decay which is typically in the order of a few days.

Based on the evaluation of the user's cumulated audio dose A(t), a playlist may be selected. In other words, a set of audio tracks may be selected for playback from a reservoir of audio tracks, e.g. a database on the media player or a web site. The set of audio tracks may be selected such that the cumulated audio dose A(t) stays below a predefined value $A_{max}$, i.e. $A(t) \leq A_{max}$. This condition may need to be met at all time, i.e. ∀t. If, at a point of time, the cumulated audio dose A(t) exceeds $A_{max}$, the set of audio tracks may be selected such that the time to reduce the cumulated audio dose A(t) below the predefined value $A_{max}$ is minimized.

A further aspect to be considered in the selection process of the audio tracks for the playlist is the length of the playlist, i.e. including but not limited to the number of tracks which are included in the playlist. Typically, the available degrees of freedom for meeting the target of keeping the cumulated audio dose below a predefined value increase with the number of audio tracks in the playlist. If the number of audio tracks is large, a mixture of tracks with relatively high average SPL values $S_i$ and tracks with relatively low average SPL values $S_i$ may be selected. Using the above recursive formula for the cumulated audio dose A(t), an order of playback of the playlist could be determined which meets the condition $A(t) \leq A_{max}$. If, on the other hand, the number of tracks within the playlist is small, the selected audio tracks will typically have medium average SPL values $S_i$, such that each individual audio track in the playlist approximately meets the condition that its average SPL value $S_i$ does not exceed a predefined maximum SPL value $S_{max}$.

In other words, when selecting a given number of audio tracks from a database or website to form the playlist, the audio dose $A_i$ and/or the average SPL values $S_i$ of the audio tracks are taken into consideration. Furthermore, other criteria, e.g. the similarity of a certain music track i to a desired category of music and/or the genre and/or the author of the audio track, may be taken into account when selecting music tracks for the playlist.

Apart from selecting a set of audio tracks for a playlist, other factors, such as the order of the playlist, the skipping of certain audio tracks, the partial playback of certain audio tracks, etc., may influence the user's cumulated audio dose A(t). By way of example, the audio tracks in a playlist may be played back randomly, while the cumulated audio dose A(t) is monitored. If, at a point of time, the cumulated audio dose exceeds the maximum allowed audio dose $A_{max}$, audio tracks with low average SPL values $S_i$ may be selected from the playlist, and played back until the cumulated audio dose has dropped to a threshold value, which is typically lower than $A_{max}$ in order to provide an audio dose buffer. Once the latter condition is met, the random playback of audio tracks of the playlist may be resumed. In this context, different pieces of music may be sorted according to their SPL values or relative audio dose contribution $S_i$. If at a particular point of time, the cumulated audio dose A(t) exceeds the allowed limit, audio tracks with low $S_i$ values may be easily inserted in order to reduce the cumulated audio dose.

Figure 4:
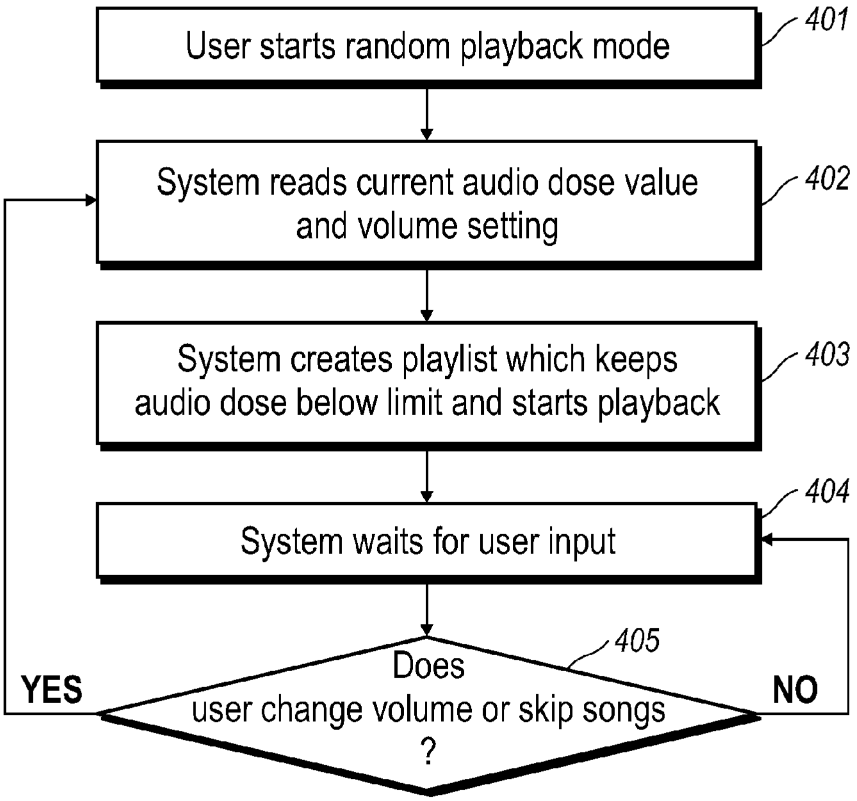
FIG. 4 illustrates a flow diagram of an exemplary method for generating a playlist which takes into account the cumulated audio dose.

FIG. 4 illustrates a flow chart of an exemplary solution for a (random) playlist generation which is adapted every time the user interacts with the music playback and causes changes to the settings of the media player which affect the sound pressure level. Such changes to the settings may result from changes of the overall volume setting. The steps outlined in FIG. 4 are shown for exemplary purposes only and are to be considered as being optional.

In step 401, the user initiates a playback mode of his media player. First, the system determines the audio dose which has already been consumed by the user. Furthermore, the current volume settings and possibly the specification of the audio rendering means, e.g. the speakers or the headphones, are determined (step 402). The already consumed audio dose may be stored in and retrieved from a memory of the media player. Alternatively or in addition, the audio dose which has already been consumed by the user on other devices may be taken into account. By way of example, the current device may retrieve the already consumed audio dose from a central network server, where such data is collected and stored for a plurality of media players. The already consumed audio dose may also be transferred from one media player to a next using short range communication means such as Bluetooth™.

In step 403, the media player generates a playlist according to the methods outlined in the present document. This playlist takes into account the already consumed audio dose, the current volume settings and/or the specification of the audio rendering means, and aims at maintaining the cumulated consumed audio dose below a predetermined limit. The playlist may be determined in different manners. Depending on the length of the playlist, a certain number of audio tracks may be selected from a database or website. This selection process should take into account the relative audio contribution values $S_i$ of the audio tracks, such that a mix of audio tracks is available in the playlist which jointly can meet the requirements with regards to the cumulated audio dose. Furthermore, musical preferences and similarities or genres or interprets may be considered, when selecting audio tracks for a playlist. In addition to selecting the audio tracks for the playlist, an order of the playlist may be determined, such that the conditions with respect to the cumulated audio dose are met. Furthermore, selective measures may be taken, if at a point of time, the cumulated audio dose exceeds a predefined value. By way of examples, audio tracks with excessive audio dose may be skipped and/or audio tracks with a low audio dose contribution may be inserted.

In an embodiment, a plurality of predefined levels of cumulated audio dose is considered when generating the playlist, i.e. when selecting the audio tracks of the playlist and when determining their order of playback. Such a plurality of predefined levels may be used to define different sets of rules for the generation of the playlist. By way of example, if a first level of cumulated audio dose is reached, only audio tracks which significantly exceed the targeted audio dose level are excluded from the playlist. With increasing level of cumulated audio dose further audio tracks may be excluded, until eventually only audio tracks with a low audio dose contribution may be played back, in order to meet the overall cumulated audio dose target. It may also be contemplated to completely block the playback of audio tracks, if a certain level of cumulated audio dose has been reached.

A playlist may be generated by determining in advance the cumulated audio dose of the set of audio tracks using the methods outlined above. By way of example, a first set of audio tracks may be selected and the cumulated audio dose may be determined in advance using the above formula. If the cumulated audio dose exceeds the predetermined level, the audio tracks which provide the highest audio dose contribution may be replaced with audio tracks which contribute a reduced audio dose. By performing such an iterative process, a playlist may be generated which comprises audio tracks that meet the desired audio dose target. Such a generation scheme for a playlist which takes into account a plurality of future audio tracks may be referred to as a predictive generation of a playlist. A predictive generation scheme is opposed to an ad hoc generation scheme of a playlist, where at any time only the immediately next audio track in the playlist is selected.

Different schemes for the computation of the cumulated audio dose may be used. The audio dose of the currently played audio track may be added to the previously consumed audio dose, e.g. using the formula provided above. The accumulation may be performed smoothly, such that continuously a fraction of the audio dose of the audio track is added to the cumulated audio dose when the audio track is played back. This has the advantage that when the playback of an audio track is interrupted, the cumulated audio dose is accurate. Alternatively, the audio dose of an audio track may be added to the cumulated audio dose, once the complete audio track has been played back. If the audio track is interrupted, only a respective fraction of the audio dose is added to the cumulated audio dose.

If no user input is performed, the audio tracks of the determined playlist are played back on the media player (step 404). However, if it is determined that the user has changed the volume settings of the device or that the user has modified the playlist (step 405), the system returns to steps 402 and 403, in order to determine an updated playlist, e.g. an updated set of audio tracks and/or an updated order of playback of the set of audio tracks, which takes into account the modifications made by the user. It should be noted that if the user has interrupted an audio track which was currently on playback, only a fractional part of the audio dose of that audio track should be added to the cumulated audio dose. This could be done by only considering the fraction of the audio dose which corresponds to the already played time of the audio track.

According to an aspect, a media player may be used by a plurality of users. In such cases, it is desirable that the consumed audio dose is monitored for the different users separately. For this purpose, a plurality of user accounts associated with the plurality of users could be managed on the media player. At the beginning of a session, a particular user would be prompted for a user identification and possibly a password. In addition, the user may be requested to provide the media player with information related to the already consumed audio dose. By using the user identification, the media player could execute the above methods for each user separately and thereby monitor and possibly limit the consumed audio dose.

It may be contemplated to allow a plurality of users to register with the media player at the same time. This may be beneficial when monitoring the audio dose or sound pressure level exposure consumed by a plurality of users using the same media player. By way of example, a plurality of headphones may be connected to the same media player. In a further example, a set of speakers may be used, thereby exposing a plurality of users to the audio dose. By allowing a plurality of users to be registered on the media player in parallel, the consumed audio dose could be monitored for each individual user in parallel. Each user could be given the possibility to inform the media player of the already consumed audio dose, when registering on the media player. It should be noted that as a result of different users entering different initial consumed audio dose values, conflicts between the separate monitoring processes for the different users may arise. By way of example, a user having entered a high initial consumed audio dose value may reach the maximum allowed audio dose, while others are still within the allowed range. To resolve such conflicts, the generation of the playlist may be performed according to the above methods, such that the maximum allowed audio dose is not exceeded for any one of the registered users.

Upon interruption of a session and/or upon leaving the media player, a user of the media player may de-register from the media player, e.g. by entering a user identification and possibly a password. Upon de-registration the media player may inform the user about the cumulated consumed audio dose, such that the user may provide this information to a subsequent media player. In view of the fact that the media player monitors each active user on the media player separately, such de-registration will typically not impact the monitoring for the other users registered with the media player.

The above examples are not intended to be an exclusive list of techniques whereby an audio dose may be controlled based upon the evaluation of the audio dose of one or more media tracks and the already consumed audio dose of the user within one or more frequency ranges. In some instances, variations or combinations of the above techniques may be employed.

Figure 5:
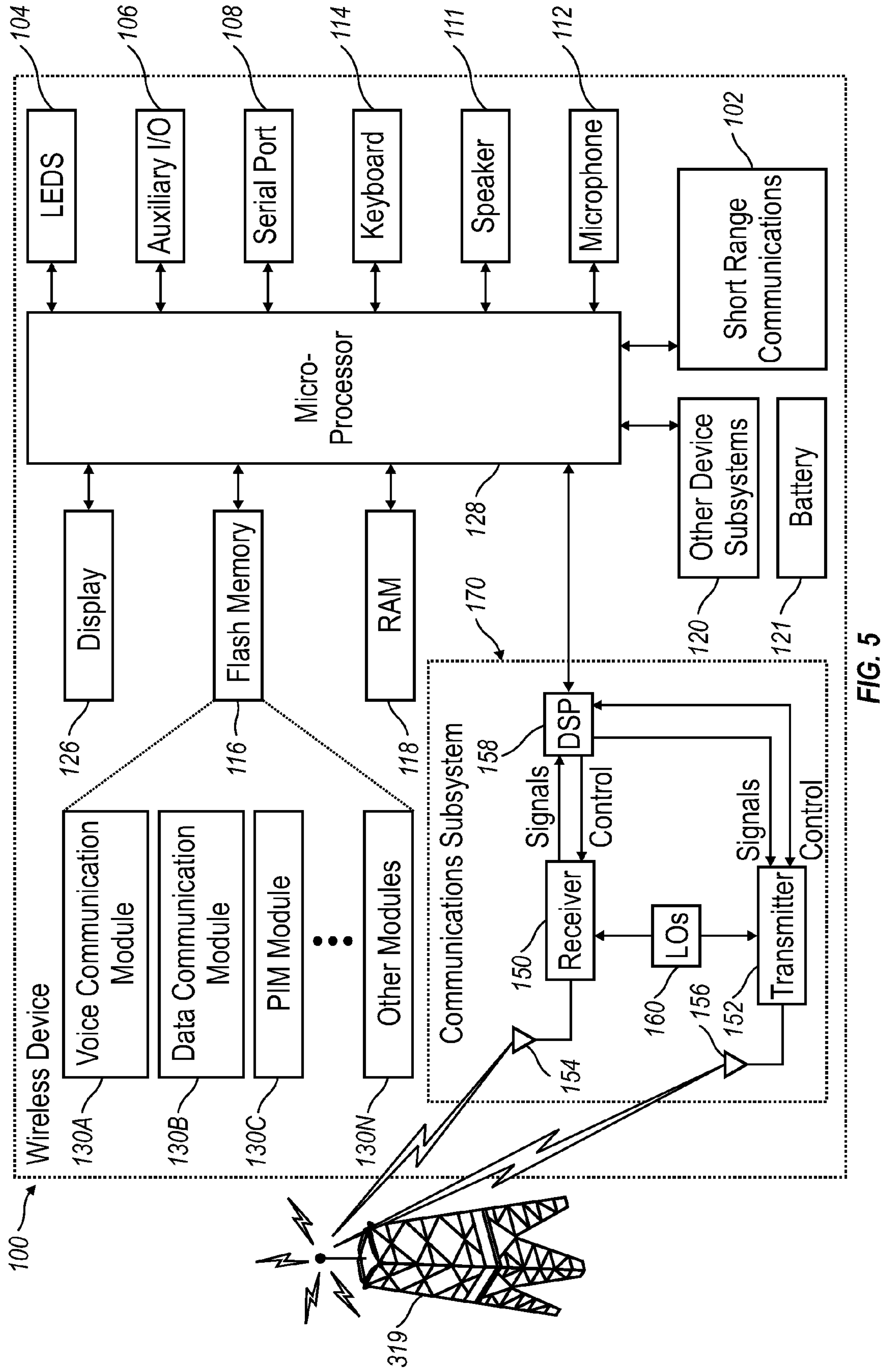
FIG. 5 shows an exemplary mobile device on which the methods and systems described in the present document may be implemented.

Referring to FIG. 5, shown is a block diagram of a mobile station, user equipment or wireless device 100 that may, for example, implement any of the methods described in this disclosure. It is to be understood that the wireless device 100 is shown with specific details for exemplary purposes only. A processing device (a microprocessor 128) is shown schematically as coupled between a keyboard 114 and a display 126. The microprocessor 128 controls operation of the display 126, as well as overall operation of the wireless device 100, in response to actuation of keys on the keyboard 114 by a user.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118.

Further, one or more storage elements may have loaded thereon executable instructions that can cause a processor, such as microprocessor 128, to perform any of the method outlined in the present document.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. As well, additional software modules, illustrated as another software module 130N, may be installed during manufacture. Such additional software module may also comprise an audio and/or video player application according to the present disclosure.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 includes functionality for implementing one or more of the embodiments described above in detail. The specific design and implementation of the communication subsystem 170 is dependent upon the communication network in which the wireless device 100 is intended to operate.

In a data communication mode, a received signal, such as a text message or web page download of a video/audio track, is processed by the communication subsystem 170 and is input to the microprocessor 128. The received signal is then further processed by the microprocessor 128 for an output to the display 126, the speaker 111 or alternatively to some other auxiliary I/O devices 106, e.g. a set of headphones or other audio rendering means. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. The short-range communications subsystem 102 enables communication between the wireless device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

In a particular embodiment, one or more of the above-described methods for audio track download are implemented by the communications subsystem 170, the microprocessor 128, the RAM 118, and the data communications module 130B, collectively appropriately configured to implement one of the methods described herein. Furthermore, one or more of the above-described methods for video and/or audio playback are implemented by a software module 130N, the RAM 118, the microprocessor 128, the display 126, and an auxiliary I/O 106 such as a set of headphone and/or the speaker(s) 111.

In the present document methods and systems have been described which may be used to protect a user of media players or mobile telephones against hearing impairments caused by an excessive exposure to high sound pressure levels. It is proposed to perform an automatic music selection or more generally an automatic audio selection which meets pre-defined audio dose requirements and which at the same time enhances the overall user experience. This can be achieved by taking into account the listening history of the particular user or device. The proposed methods can be implemented with low computational complexity and are therefore well adapted for the use in portable electronic devices. Further, the techniques described herein offer the potential advantage of adaptation to the listening habits of different users.

The methods and systems described in the present document may be implemented as software, firmware and/or hardware. Certain components may e.g. be implemented as software running on a digital signal processor or microprocessor, e.g. the microprocessor 128 of the mobile device 100. Other components may e.g. be implemented as hardware or as application specific integrated circuits. The signals encountered in the described methods and systems may be stored on media such as random access memory or optical storage media. They may be transferred via networks, such as radio networks, satellite networks or wireless networks. Typical devices making use of the method and system described in the present document are dedicated media players (including, but not limited to, dedicated audio players), mobile telephones or smartphones.

What is claimed is:

1. A method for controlling an audio dose consumed by a user of a media player having a processor configured to execute each step of the method, the method comprising:

determining the audio dose already consumed by the user;

determining the audio doses of a plurality of media tracks;

weighting the already consumed audio dose by a first weight;

weighting the audio doses of the plurality of media tracks by respective second weights;

the first and second weights adding up to one;

determining a plurality of potentially consumed audio doses for the plurality of media tracks as a plurality of weighted sums of the already consumed audio dose and the audio doses of the plurality of media tracks, respectively; and selecting one or more media tracks from the plurality of media tracks for play back on the media player, with a smallest weighted sum amongst the plurality of media tracks or weighted sum smaller than a pre-determined value.

2. The method of claim 1, wherein determining the already consumed audio dose comprises determining the audio dose consumed within a pre-determined time interval prior to the time instance of playing back the selected media track.

3. The method of claim 1, wherein determining the already consumed audio dose comprises weighting the consumed audio dose with a weight associated with the time instance at which the audio dose was consumed; wherein the weight decreases with increasing anteriority of the consumed audio dose.

4. The method of claim 1, wherein determining the audio dose of a media track comprises:

determining spectral components of the media track;

weighting the spectral components using weights associated with human auditory perception; and determining the audio dose of the media track(s) based on the weighted spectral components.

5. The method of claim 1, comprising:

determining a playlist for playing back media tracks on the media player by selecting media tracks from the plurality of media tracks based on the plurality of weighted sums.

6. The method of claim 1, wherein determining the audio dose of a media track comprises:

extracting a plurality of segments of the media track using a window function;

determining the audio doses for the plurality of segments of the media track; and determining the audio dose of the media track as the sum of the audio doses of the plurality of segments of the media track.

7. The method of claim 1, wherein the second weights depends on the duration of the respective media tracks from the plurality of media tracks.

8. The method of claim 7, wherein the second weights decreases with an increased duration of the respective media tracks from the plurality of media tracks.

9. The method of claim 1, further comprising updating the audio dose consumed by the user, the updating being based on a leaky integration of the previously consumed audio dose and the audio dose of the selected media track.

10. The method of claim 1, further comprising selecting a media category including a plurality of media tracks that are available for playback on the media player, wherein the selection of a media track is restricted to media tracks from the selected category.

11. An electronic device comprising an audio rendering component operable to generate an audio dose to a user;

a memory operable to store a plurality of media tracks; and a processor operable to determine the audio dose already consumed by the user;

determine the audio doses of the plurality of media tracks;

weight the already consumed audio dose by a first weight;

weight the audio doses of the plurality of media tracks by respective second weights;

the first and second weights adding up to one;

determine a plurality of potentially consumed audio doses for the plurality of media tracks as a plurality of weighted sums of the already consumed audio dose and the audio doses of the plurality of media tracks, respectively; and select a media track from the plurality of media tracks for play back with a smallest weighted sum amongst the plurality of media tracks or weighted sum smaller than a pre-determined value.

12. A non-transitory storage medium comprising a software program adapted for execution on a processor and for performing the method of claim 1 when carried out on a computing device.

* * * * *